United States Patent [19]
Burke

[11] Patent Number: 5,694,434
[45] Date of Patent: Dec. 2, 1997

[54] METHODS AND APPARATUS FOR PROCESSING BURST SIGNALS IN A TELECOMMUNICATION SYSTEM

[75] Inventor: Timothy M. Burke, Algonquin, Ill.

[73] Assignee: Motorola, Inc., Schaumburg, Ill.

[21] Appl. No.: 583,736

[22] Filed: Jan. 17, 1996

[51] Int. Cl.$^6$ .......................... H03D 1/00; H04L 27/06
[52] U.S. Cl. .................. 375/340; 375/355; 375/330
[58] Field of Search ........................ 375/340, 354, 375/355, 330, 331, 329, 324, 325, 279, 283; 327/141; 455/49.1, 53.1, 57.1, 3.1, 3.2, 3.3, 6.1, 6.2; 370/77, 110.1, 105.1

[56] References Cited

U.S. PATENT DOCUMENTS 4,937,841  6/1990  Chuang et al. ................ 375/340

*Primary Examiner*—Stephen Chin
*Assistant Examiner*—Hai H. Phan
*Attorney, Agent, or Firm*—Aaron Bernstein; Jordan C. Powell

[57] ABSTRACT

A control unit (102) efficiently decodes burst signal transmissions in a TDMA-based telecommunication system (100) by decimating down the number of samples requiring processing during symbol detection. The control unit (102) includes a sampling receiver (304) that inputs burst signals from cable access units, converts them to a pair of baseband quadrature signals, I and Q. The sampling receiver (304) also includes an A/D converter (314) that samples the I and Q signals at preferably four times the symbol rate. A digital signal processor circuit (306) produces a timing error signal for substantially all of the samples. The digital processor circuit (306) also accumulates a timing error sum for each of the four samples. The processor circuit (306) selects the optimum sample as the sample between the samples having the largest positive and negative error sums. The processor circuit (306) also includes a π/4-DQPSK differential detector that processes the optimum sample of each symbol for symbol detection.

19 Claims, 2 Drawing Sheets

METHODS AND APPARATUS FOR PROCESSING BURST SIGNALS IN A TELECOMMUNICATION SYSTEM

BACKGROUND OF THE INVENTION

The present invention relates, in general, to telecommunication systems, and more particularly to processing burst signals that are transmitted in telecommunication systems.

Certain telecommunications schemes require that signals and/or information transmitted from a remote location arrive at another location during a predetermined time slot. For example, a telecommunication system using Time Division Multiple Access (TDMA) requires that bursts of information transmitted by a transmitting device be received during a predetermined/known time slot at the receiving device. In TDMA based systems, individual users may share a transmission medium by being assigned, for a limited time, to one or more time slots.

TDMA is one common method utilized in, for example, cable telecommunication infrastructures, to control the transfer of information. Cable telecommunication infrastructures typically comprise a central hub servicing various nodes, such that one or more nodes are at the end of each spoke of the hub. The spokes are typically fiber optic cable. The fiber optic cable leads to a distribution portion of coaxial cable extending to individual subscribers such as homes, businesses, etc. The distribution portion at the end of a particular spoke is often divided into manageable subsets, for example 20 kilometer radius subsets, which are the individual nodes. The nodes typically include one or more subscriber drops that connect the individual subscribers to the cable communication system.

A control unit at the hub is responsible for receiving and actively routing signals and bursts of information from each of the various subscribers, and must therefore receive signals from the subscribers during predetermined time slots. The information is typically transmitted to the control unit as a burst of information within the predetermined time slot. Therefore, the control unit must be able to analyze the signals sent from the subscribers to extract the information from the received signal. The analysis, which includes determining the specific timing of the signal within the time slot, detecting the burst containing a number of symbols which embody the transmitted information (i.e., symbol detection), and decoding the burst into the detected symbols, requires extensive processing capability.

Previous attempts have been made to address the intense processing requirements of TDMA systems. For example, Chuang et al. U.S. Pat. No. 4,937,841 provides carrier recovery in radio TDMA systems by sampling incoming symbols at a rate of 16 samples per symbol, then storing half the symbol and performing coherent demodulation using the two-halves of the received signal. While Chuang is quite adequate for transmission systems such as radio that have relatively low symbol rates, the Chuang solution might not be adequate for telecommunication systems, such as the cable infrastructure described above which tend to have much faster symbol rates.

Further, while cable telecommunication infrastructures have traditionally been associated with television transmission, they are now being utilized more and more for two way communications employing schemes that may require even higher symbol rates to perform adequately. Consequently, there is a need for TDMA-based systems and methods that efficiently process signals between various components of a telecommunication system at relatively high symbol rates, when compared to the symbols rates required for radio systems.

DETAILED DESCRIPTION OF THE DRAWINGS

Generally, the present invention provides methods and apparatus for efficient processing of burst signals transmitted in a TDMA-based telecommunication system. More specifically, the methods and apparatus of the present invention are particularly suited for efficient processing of burst signals in a TDMA-based telecommunication system utilizing a cable communication infrastructure.

In accordance with the principles of the present invention, TDMA-based transmission methods and apparatus are presented that perform efficient processing of burst signals at relatively high symbol rates. Complex signal bursts, including noise and signal information located somewhere within a predetermined time slot window, are stored. Processing circuitry determines the timing of the burst, detects the symbols within the burst and decodes the burst into data for further processing by the cable control unit. The processing circuitry efficiently performs signal processing on the burst signals received by the control unit such that a symbol rate of at least 368 kilosymbols per second is maintained.

Figure 1:
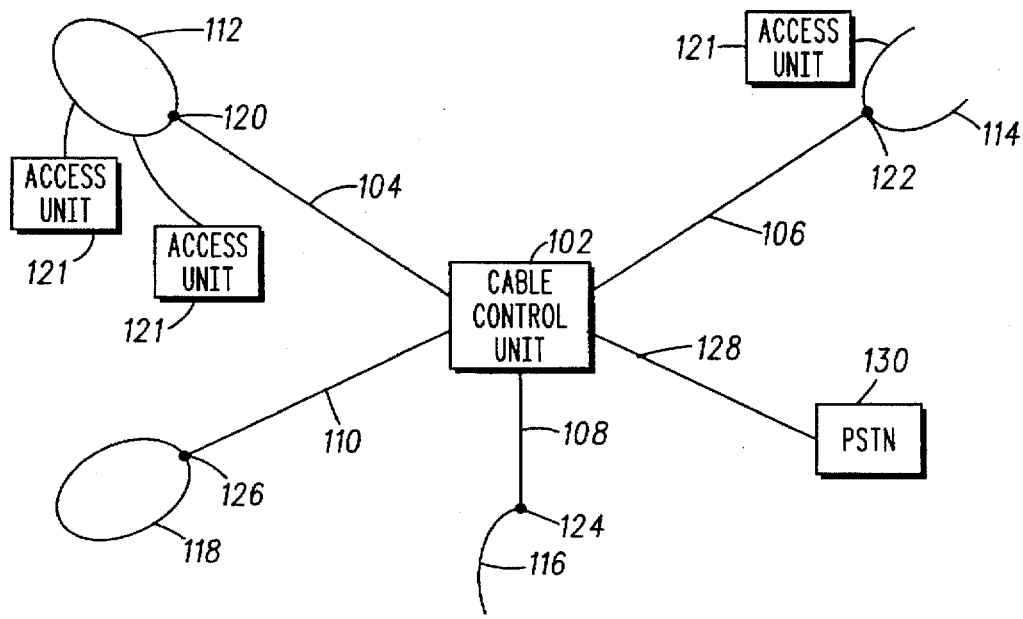
FIG. 1 is a schematic diagram of a telecommunication system using a cable communication infrastructure.

Turning to the figures for a more detailed understanding of the principles of the present invention, FIG. 1 shows a schematic overview of a cable communication infrastructure configured for two way communications such as, for example, the placement of telephone calls or the bi-directional transmission of computer data. Referring to FIG. 1, a telecommunication system 100 consists of a cable control unit 102 (CCU). The cable control unit 102 serves to receive and actively route signals (i.e., information) throughout the system 100, as well as to carry out other system administration functions.

Extending from the cable control unit 102 (i.e., hub) are several spokes 104, 106, 108 and 110, which are preferably fiber optic cables. The spokes 104–110 may be of other suitable transmission medium, such as low-loss coaxial cable, depending upon the particular application, topography and system requirements. The spokes 104–110 serve as "trunks" for the telecommunication system 100, as is readily apparent to persons skilled in art.

The fiber optic spokes 104–110 each lead to a particular one of the distribution portions 112, 114, 116 and 118, respectively. Each one of the distribution portions 112–118 is located at the end of the corresponding one of the spokes 104–110, each of which effectively terminates at one of the distribution points 120, 122, 124 and 126, respectively. Typically, the distribution portions 112–118 consist of coaxial cable, rather than fiber optic cable, that distributes signals to and from individual subscribers via cable access units 121 (three of which are shown, but it will be understood that there may in fact be one for every subscriber on the distributed cable system).

The distribution portions 112–118 are shown in a variety of representative configurations in order to illustrate that such variety may be employed. For example, the distribution portion 112 is shown as a loop, whereas distribution portions 114 and 116 are shown as varying stubs. Thus, the specific configuration selected for each distribution portion is not considered to be a limiting factor of the present invention.

In addition to distribution portions, cable control unit 102 may also be connected to other communication systems via gateways. For example, a spoke 128 extends from control unit 102 to a Public Switched Telephone Network (PSTN) 130. The spoke 128 can be a fiber optic cable similar to the spokes 104–110, or spoke 128 may be any other suitable transmission medium that is known to persons skilled in the art. Thus, the communication system 100 may be utilized to access all commonly available communications networks via cable 128 and various gateways, such as PSTN 130.

Figure 2:
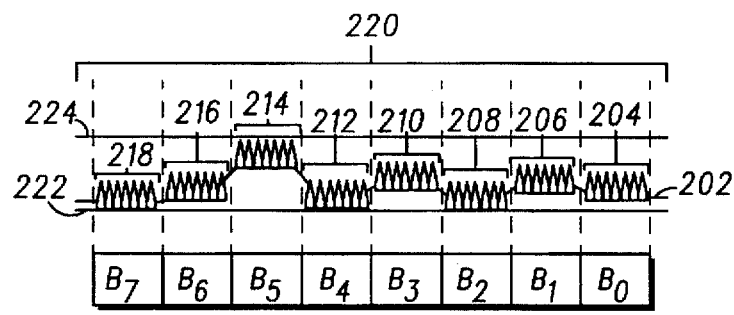
FIG. 2 is a timing diagram showing a sample stream of information bursts as initially received by a control unit of the telecommunication system shown in FIG. 1.

A representative example of data transmission between control unit 102 and various cable access units 121 along any of distribution portions 112–118 is shown in FIG. 2. Received signal 202 includes eight bursts of information 204–218 that are received by the control unit 102. Each burst of information will typically come from a different access unit 121. Each burst of information is completely received within a predetermined time slot alignment window, as indicated by dashed lines 220. The distance between any two of the dashed lines 220 represents a single time slot alignment window. Thus, FIG. 2 shows information bursts received for time slot windows B0–B7.

Each burst within the respective time slots is made up of many individual "symbols" which embody the digital information that is being transmitted. While, it is preferable that the time slot windows B0–B7 be 120 symbols wide (i.e., 240 bits) for use in the cable telecommunication system 100, actual window length may vary without departing from the scope and spirit of the principles of the present invention. Additionally, as is well known in the art, the length of the actual burst is typically shorter than the window length to accommodate for slight variations in transmission. To that end, in the preferred embodiments of the present invention, information bursts 204–218 are 112 symbols long, with eight symbols of variance available for each window.

As shown by limits 222 and 224, the received bursts 204–218 are at different power levels and are not phase continuous at the control unit 102. This is due to the fact that the transmitting subscriber access units 121, which generate the bursts, are at different physical locations within the network and are not synchronized at the symbol level. The variations in amplitude, that may be up to about 26 dB in preferred embodiments, is substantially due to the different distances each of the cable access units are from the control unit 102. The variations in amplitude and phase, combined with the relatively short duration of the information burst (i.e., 112 symbols) requires all processing of sequential bursts to be independent and new symbol timing must be established from burst to burst. These are particularly severe systems demands, but the method of the present invention in nevertheless capable of the necessary processing.

Figure 3:
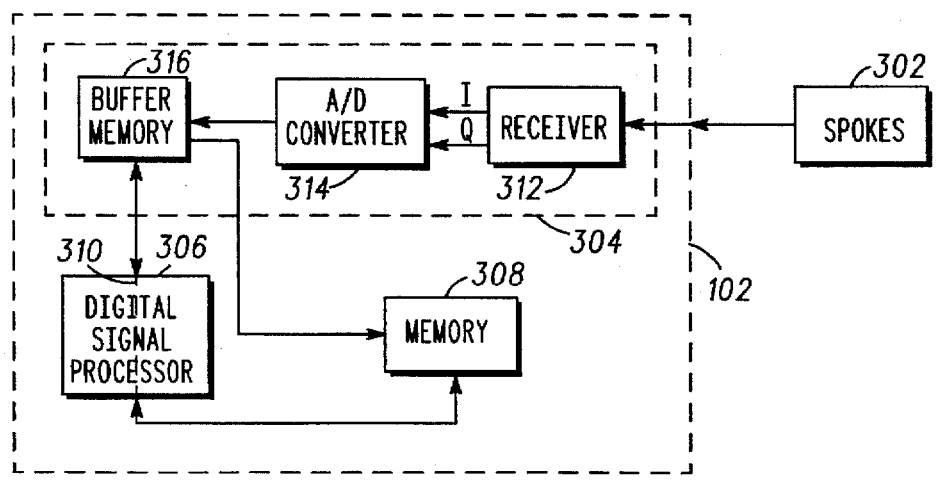
FIG. 3 is a schematic block diagram of a preferred cable control unit of the telecommunication system shown in FIG. 1.

A detailed view of the control unit 102 that incorporates the principles of the present invention is shown in FIG. 3. The control unit 102 is connected to the cable access units 121 via spokes 302. Spokes 302 merely represents any of the spokes 112–118 shown in FIG. 1, and/or and additional spokes connected to the telecommunication system 100, but not shown. The spokes 302 are connected to a sampling receiver 304 within the control unit 102. Also included in the control unit 102 is digital signal processor (DSP) circuitry 306 and processor memory 308. In the preferred embodiment of the present invention, DSP circuitry 306 includes a pair of DSPs, as indicated by dashed line 310, that share the processing requirements of the control unit 102. The DSPs are also viewed as comprising timing error detection circuitry, accumulation circuitry, evaluation circuitry, and symbol detection circuitry, all used in the particular method described below.

The sampling receiver 304 preferably includes a conventional heterodyne receiver 312 that filters the received signal and converts the filtered signal to a pair of baseband quadrature signals labeled in-phase (I) and in-quadrature (Q). Analog-to-digital (A/D) circuitry 314 (also referred to as conversion circuitry 314), which is connected to the output of the receiver 312, samples the I and Q signals to produce digital signals that are stored in a buffer memory 316. A/D circuitry 314 preferably includes a pair of A/D converters, while the buffer memory 316 is preferably dual ported random access memory (RAM) comprising odd memory and even memory. The buffer memory may be connected directly to the DSP circuitry 306 and to the processor memory 308.

Figure 4:
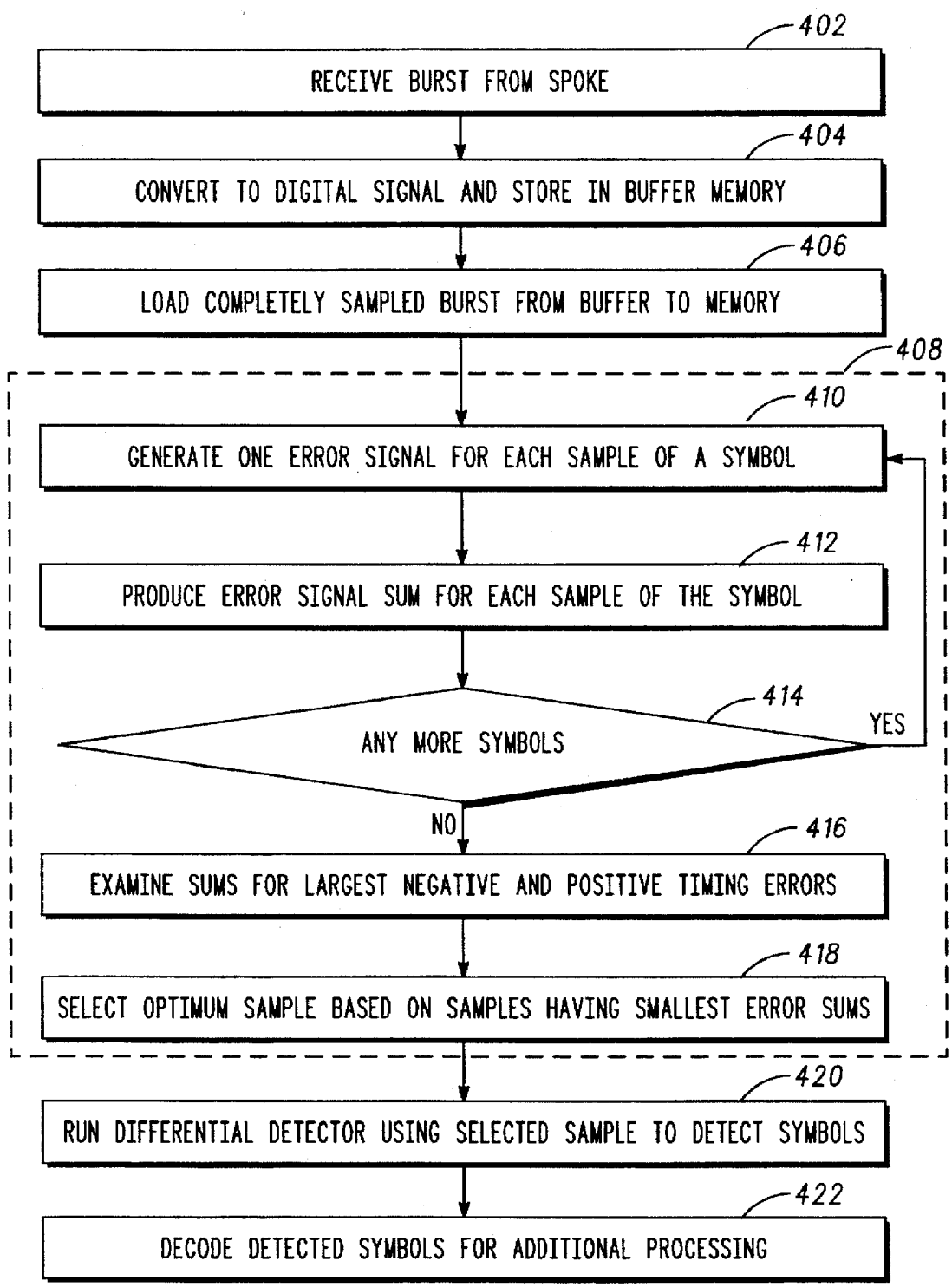
FIG. 4 is a flow chart illustrating the processing performed by the cable control unit of FIG. 3 to efficiently decode burst transmissions from subscriber units in the telecommunication system of FIG. 1.

The operation of the preferred control unit 102 is described in conjunction with the flow chart shown in FIG. 4. The information bursts are input to the sampling receiver 304 in a step 402. The sampling receiver filters the received signals, converts the filtered signals into quadrature signals I and Q, A/D converts I and Q into digital signals and stores the digital signals in the buffer memory 316 during a step 404. The advantages of the present invention permit the step 404 to be accomplished at an A/D conversion rate of four times the sampling rate without any substantial loss of performance.

It is preferable to increase the performance capabilities of the telecommunication system 100 by utilizing the dual A/D converters 314 and the dual ported RAM 316 to alternatively store odd and even numbered bursts. For example, bursts B0, B2, B4 and B6 are stored in even RAM while bursts B1, B3, B5 and B7 are stored in odd RAM. The odd/even configuration, coupled with dual DSPs for DSP circuitry 306, provides relatively robust performance to the control unit 102, as is described more fully below.

Each individual burst of information (i.e., one of bursts B0–B7) is loaded from the buffer memory 316 to the processor memory 308 in a step 406. The DSP circuitry 306 performs symbol timing recovery on the completely sampled information bursts during collective steps 408 (as indicated by the dashed box in FIG. 4). Each of the symbols of a the particular burst that is stored in the processor memory 308 has been sampled four times by the A/D converters 314. Symbol timing steps 408 include steps 410–418 that determine which of the four samples is the optimum sample for all of the symbols in a given burst.

The steps 410–414 are performed as a loop that sequentially processes each symbol in the loaded burst (with the exception of the first symbol, as is explained more fully below). In the step 410, a timing error signal is generated for each one of the four samples of the selected symbol. However, because of the reliance on the previous sample in performing the timing error calculation, the first symbol in each burst does not have a timing error calculation processed. The timing error signal is preferably determined based on the following equation:

$$E_n = Y_I(r-2)[Y_I(r)-Y_I(r-4)] + Y_Q(r-2)[Y_Q(r)-Y_Q(r-4)]$$

where n selects which one of the four samples is the current sample, Y(r) represents the current sample (for the I and Q quadrature signals), Y(r−2) represents the sample one-half a symbol past and Y(r−4) represents the current sample of the previous symbol. In the step 412, a running sum of each of the four timing error signals is accumulated. A decision is made in the step 414 based upon whether all of the symbols have been processed for timing error signals. If there are unprocessed symbols remaining, control returns to the step 410, otherwise processing continues at the step 416.

The processor 306, in the step 418, determines which of the four timing error sums has the largest negative error value and which has the largest positive error value. Based on these values, the processor 306 selects one of the four samples as the optimum sample in the step 418. The selection processes chooses the sample that is between the two samples identified in the step 416. For example, if sample n=2 had the largest negative timing error (indicating a large timing correction to the right) and sample n=4 had the largest positive timing error (indicating a large timing correction to the left), the processor 306 chooses sample n=3 as the optimum sample.

This selection process is performed in a modulo-4 fashion. For example, if sample n=4 has the largest negative timing error and sample n=2 has the largest positive timing error, the processor 306 chooses sample n=1 as the optimum sample. In this fashion, the processing wraps around the sample set from 1 to 4. Alternatively, rather than searching for the most positive and negative error samples and choosing the sample that falls between these values, the process can be enhanced by simply searching for the most negative timing error and choosing the next highest sample number in a modulo-4 fashion. This selection is statistically the optimum sample under conditions that include high noise levels or low signal-to-noise ratio.

In accordance with the principles of the present invention, the selection of an optimum sample greatly reduces further processing requirements on the control unit 102 because only the selected sample is used for symbol detection. Thus, even though the information burst contains 480 complex samples, only 120 of those samples are used during symbol detection. Additionally, the preferred embodiments require only the initial sampling to be performed at four times the sampling rate. That is, as is typical in TDMA systems, several successive ones of the same numbered time slot (e.g. slot 2) in the group of eight (B0–B7) will come form the same access unit. Only the first of the successive slot 2s need four samples per symbol, because the best sample (for signals from that particular access unit) can be determined from the first burst. Consequently, the present invention further reduces processing requirements and increases throughput.

Once the optimum sample has been chosen during the steps 408, the control unit 102 continues processing the sampled burst to detect and decode the symbols from the burst. In a step 420, the processor 306 preferably performs differential detection on the 120 selected samples using a π/4-DQPSK differential detector. By utilizing differential detection, phase errors are substantially canceled out. The differential detector extracts the information from the received signal, substantially removing the noise from the signal. Persons skilled in the art will readily understand that signal detection is well known in the art and that various detection programs may be implemented in performing the processing step 420 without departing from the principles of the present invention. Once the symbols are detected, the processor 306 synchronizes the symbols, in a step 422, so they are decoded for further processing by the control unit 102.

It will be understood that the foregoing is only illustrative of the principles of the invention, and that various modifications can be made by those skilled in the art without departing from the scope and spirit of the invention. For example, while the cable telecommunications system shown in FIG. 1 utilizes a PSTN for connection to a local telephone system, alternative connections may be made directly to other cable telecommunication systems, or directly to various long distance service providers.

What is claimed is:

1. A method for processing burst signals in a telecommunication system including decoding the burst signals transmitted between an access unit and a control unit in the telecommunication system, the method comprising the steps of:

receiving, at the control unit, a burst signal within a predetermined time slot window, the burst signal having a predetermined length less than a length of the time slot window, the burst signals each comprising a plurality of symbols;

converting the burst signal into a digital signal by sampling the burst signal at a sampling rate such that each symbol is represented by a predetermined number of samples;

loading the digital signal into memory;

producing a timing error signal for each sample of substantially all of the symbols in the burst signal;

generating a number of timing error sums, where the number of timing error sums is the predetermined number of samples, each of the number of timing error sums determined by summing the timing error signals for all of the symbols within the burst signal for each of the predetermined number of samples such that each of the predetermined number of samples has an associated one of the number of timing error sums;

examining the timing error sums to select the timing error sum having a largest negative value and the timing error sum having a largest positive value;

selecting an optimum sample based on the results of the step of examining; and detecting the symbols from the burst signal by processing the optimum sample for each of the symbols.

2. The method of claim 1, wherein the length of the time slot window is 120 symbols.

3. The method of claim 2, wherein the predetermined length of the burst signal is 112 symbols.

4. The method of claim 1, wherein the sampling rate is four times a symbol rate.

5. The method of claim 4, wherein the steps of converting and loading comprise the steps of:

passing even numbered burst signals through analog-to-digital circuitry at the sampling rate to produce even numbered digital signals;

passing odd numbered burst signals through analog-to-digital circuitry at the sampling rate to produce odd numbered digital signals;

loading odd numbered digital signals into dual ported random access memory; and loading even numbered digital signals into dual ported random access memory.

6. The method of claim 5, wherein the steps of producing and summing are performed by first and second digital signal processors, such that the first digital signal processor processes the odd numbered digital signals and the second digital signal processor processes the even numbered digital signals.

7. The method of claim 6, wherein the step of detecting is performed on the odd numbered signals by the first digital signal processor and on the even numbered signals by the second digital signal processor.

8. The method of claim 1, wherein the step of converting stores each digital signal into a buffer memory and the step of loading loads the digital signal from the buffer memory into a processor memory.

9. The method of claim 1, wherein the step of detecting comprises processing the selected sample for each symbol in a differential detector.

10. The method of claim 9, wherein the differential detector is a π/4-DOPSK differential detector.

11. A method for processing burst signals in a telecommunication system including determining symbol timing in a burst transmission of a TDMA-based telecommunication system between a cable control unit and a cable access unit at a subscriber site, the method comprising the steps of:

loading a sampled digital signal into memory, the sampled digital signal having a predetermined number of symbols, each symbol being represented by four samples;

generating a timing error signal for substantially every sample of the sampled digital signal;

generating four timing error sums, each of the four timing error sums determined by summing the timing error signals for all of the symbols within the burst signal for each of the four samples such that each of the four samples has an associated one of the four timing error sums; and evaluating the timing error sums to select an optimum sample of the four samples.

12. An apparatus for processing burst signals in a telecommunication system including a control unit for use in a TDMA-based telecommunications system that includes a plurality of access units that transmit information to the control unit in bursts within predetermined time slot windows, each burst having a predetermined number of symbols, the control unit comprising:

sampling receiver circuitry coupled to at least one of the access units to receive the bursts;

conversion circuitry connected to the sampling receiver circuitry to convert the bursts to samples at a predetermined sampling rate;

memory connected to the conversion circuitry to store the samples, the memory comprising a buffer memory circuit storing bursts as they are converted, and a processor memory circuit that is accessed by a timing error detection circuitry, an accumulation circuitry, an evaluation circuitry, and a symbols detection circuitry;

the timing error detection circuitry produces a timing error signal for substantially all of the samples for each burst;

the accumulation circuitry sums the timing error signals for each burst, generating respective sums;

the evaluation circuitry processes the sums to determine an optimum sample for each burst; and the symbol detection circuitry removes noise from the burst to extract symbol information from the burst, the symbol detection circuitry operating on the optimum sample for each symbol.

13. The control unit defined in claim 12, wherein the conversion circuitry samples the bursts at four times a symbol rate, thereby generating four samples for each symbol.

14. The control unit defined in claim 12, wherein the timing error detection circuitry, the accumulation circuitry, the evaluation circuitry and the symbol detection circuitry comprise digital signal processing circuitry.

15. The control unit defined in claim 14, wherein the buffer memory circuit is dual ported random access memory and odd numbered bursts are stored in odd memory and even numbered bursts are stored in even memory.

16. The control unit defined in claim 15, wherein the digital signal processing circuitry comprises:

a first digital signal processor that processes odd numbered bursts through timing error detection, accumulation, evaluation and symbol detection; and a second digital signal processor that processes even numbered bursts through timing error detection, accumulation, evaluation and symbol detection.

17. The control unit defined in claim 12, wherein the symbol detection circuitry is a digital signal processor that includes a π/4-DQPSK differential detector.

18. The control unit defined in claim 12, wherein the predetermined time slot windows each has a length of 120 symbols.

19. The control unit defined in claim 18, wherein the predetermined number of symbols in each burst is 112.

* * * * *